3,409,723
CONTROLLING FUNGI WITH IODOBENZOYL HALIDES
John S. Adams, Jr., Centerville, Ohio, assignor to Monsanto Research Corporation, St. Louis, Mo., a corporation of Delaware
No Drawing. Filed Dec. 21, 1965, Ser. No. 515,463
4 Claims. (Cl. 424—315)

This invention relates to new and useful fungicidal compositions comprising iodobenzoyl halides. The invention further relates to methods of formulating these compounds into useful fungicides, and methods of applying them to plants and organic materials susceptible to fungus attack.

The term "fungicide" is used here to include not only the property of killing fungi but also the property of inhibiting germintation of the spores of the fungi.

Iodobenzoyl halides are nuclearly iodinated benzoyl halides and may be represented by the formula

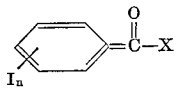

wherein X is halogen with atomic weight greater than 30 and $n$ is an integer of from 1 to 5.

Examples of presently useful iodobenzoyl halides are 2-iodobenzoyl chloride, 3 - iodbenzoyl bromide, 4 - iodobenzoyl iodide, 2,3 - diiodobenzoyl chloride, 2,4 - diiodobenzoyl bromide, 2,5 - diiodobenzoyl iodide, 2,6 - diiodobenzoyl chloride, 3,4 - diiodobenzoyl bromide, 3,5-diiodobenzoyl iodide, 2,3,4-triiodobenzoyl chloride, 2,3,5-triiodobenzoyl bromide, 2,3,6 - triiodobenzoyl iodide, 2,4,6 - triiodobenzoyl chloride, and 3,4,5 - triiodobenzoyl chloride. Their preparation is well known, for example, by reaction of an iodobenzoic acid with thionyl chloride (C. Klemme and J. Hunter, J. Org. Chem. 5, 508 (1940)). In general they are solids readily soluble in a number of common solvents. Thus, 3,4,5-triiodobenzoyl chloride melts at 138–9° C. and is soluble in carbon tetrachloride.

The iodobenzoyl halides may be used to treat soil in seedbeds or to treat seeds, or may be applied to the foliage, fruit buds or fruit of plants. They may be applied as a dust, with an inert solid carrier such as clay or talc, or as a liquid or spray in a liquid carrier, such as in solution in a suitable solvent or in suspension in a non-solvent. Still another method of application is as an aerosol, prepared either by dissolving in a highly volatile liquid carrier, or by dispersing in a gas by thermal means or aerosol-generators. Preferably when applied in an aqueous suspension or an oil-in-water emulsion, the composition contains additives which may serve to disperse the chemical or to aid in uniform application. The iodobenzoyl halides may be used alone or in admixture with other active carriers and additives including other fungicides, fumigants, bactericides, insecticides, fertilizers, hormones, or antibiotics. In addition to the uses above, the iodobenzoyl halides are effective as fungicides in protecting cloth, fibers, paper, leather, or wood.

The invention is further illustrated by, but not limited to, the following examples.

EXAMPLE 1

Protection Against *Venturia inaequalis* (Apple scab)

Selected young apple trees were used as the host. An acetone solution of 3,4,5-triiodobenzoyl chloride was prepared, containing one drop of "Tween 80" a non-ionic surface active agent, essentially sorbitan monooleate, per 10 ml. The solution was then diluted with water to a concentration of 10 p.p.m. active material. The trees were sprayed uniformly with the mixture, dried for 24 hours, and then inoculated with a spore suspension of *Venturia inaequalis* conidia containing approximately 2,500,000 spores per ml. of water. Immediately thereafter the plants were placed in an incubation chamber at 100% relative humidity and kept there for 72 hours. They were removed, dried, and evaluated after two weeks storage in a greenhouse. Excellent control of *Venturia inaequalis* was indicated by the few number of parasitized leaves found, as compared to the number of parasitized leaves found on trees treated in a similar manner with a commercial fungicide.

EXAMPLE 2

Protection Against *Rhizoctonia solani* (Seedling blight)

Greenhouse tests were made to evaluate fungicidal activity in the presence of cotton seedlings as the host plant. A culture of *Rhizoctonia solani* was blended into ordinary field soil to obtain a preponderance of that particular organism. This fortified soil was then put into containers, seeded with cotton (Delta Pine No. 15) and treated with 3,4,5 - triiodobenzoyl chloride. At a concentration of 30 p.p.m. 3,4,5-triiodobenzoyl chloride, corresponding to 0.5 lb./acre, the number of emerged healthy plants was greater than the number from similarly prepared soil treated with a commercial fungicide. This, therefore, indicated excellent control of *Rhizoctonia solani*.

It is to be understood that although the invention has been described with specific reference to particular embodiments thereof, it is not to be so limited since changes and alterations therein may be made which are within the full intended scope of this invention as defined by the appended claims.

What I claim is:

1. The method of killing fungi or inhibiting the germination of fungi spores which comprises exposing the fungi to an effective quanttity of an iodobenzoyl halide

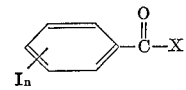

wherein X is halogen with atomic weight greater than 30 and $n$ is an integer of from 1 to 5.

2. The method as described in claim 1, wherein the halogen is chlorine.

3. The method as described in claim 1, wherein the iodobenzoyl halide is 3,4,5-triiodobenzoyl chloride.

4. The method for control of soil-borne phytopathogenic fungi which comprises applying thereto a fungicidally toxic amounts of 3,4,5-triiodobenzoyl chloride.

References Cited

UNITED STATES PATENTS

| 3,156,553 | 11/1964 | Searle | 260—554 XR |
| 3,253,012 | 5/1966 | Newcomer et al. | 260—544 XR |
| 3,261,678 | 7/1966 | Searle | 260—544 XR |

FOREIGN PATENTS

| 1,186,043 | 1/1965 | Germany. |

OTHER REFERENCES

Chem. Abstracts 34: 5066(4) (1940).
Chem. Abstracts 35: 94(3) (1941).
Chem. Abstracts 54: p. 20987e (1960).
Chem. Abstracts 55: p. 465c (1961).
Chem. Abstracts 58: p. 1396f (1963).
Chem. Abstracts 59: p. 9909e (1963).
Chem. Abstracts 60: 3430f (1964).
Chem. Abstracts 62: p. 14583f (1965).

LEWIS GOTTS, *Primary Examiner.*
S. K. ROSE, *Assistant Examiner.*